(12) United States Patent
Ostrover

(10) Patent No.: US 6,351,596 B1
(45) Date of Patent: Feb. 26, 2002

(54) CONTENT CONTROL OF BROADCAST PROGRAMS

(75) Inventor: Lewis S. Ostrover, Los Angeles, CA (US)

(73) Assignee: Time Warner Entertainment Co, LP, Burbank, CA (US)

( * ) Notice: Subject to any disclaimer, the term of this patent is extended or adjusted under 35 U.S.C. 154(b) by 0 days.

(21) Appl. No.: 09/479,819

(22) Filed: Jan. 7, 2000

(51) Int. Cl.$^7$ ................................................ H04N 5/91
(52) U.S. Cl. ............................ 386/46; 386/125; 725/28
(58) Field of Search ............................ 386/1, 6–8, 46, 386/52, 67–70, 83, 94–95, 125, 126, 55, 80; 725/14, 32, 38, 58, 86, 87, 88–102, 25, 27–28, 22; 360/7, 72.1, 72.2

(56) References Cited

U.S. PATENT DOCUMENTS

| 5,333,091 A | * | 7/1994 | Iggulden et al. ............... 386/55 |
| 5,598,276 A | | 1/1997 | Cookson et al. |
| 5,734,444 A | * | 3/1998 | Yoshinobu ................... 725/14 |
| 5,778,135 A | * | 7/1998 | Ottesen et al. ................ 386/52 |
| 5,913,013 A | | 6/1999 | Abecassis |
| 6,038,367 A | * | 3/2000 | Abecassis .................... 386/46 |
| 6,091,886 A | * | 7/2000 | Abecassis ................... 386/125 |

* cited by examiner

Primary Examiner—Wendy R. Garber
Assistant Examiner—Christopher Onnaku
(74) Attorney, Agent, or Firm—Gottlieb, Rackman & Reisman, P.C.

(57) ABSTRACT

The invention allows a personal video recorder to store and selectively play a broadcast program whose scenes are tagged with content codes. The personal video recorder utilizes user preferences, derived from user inputs. When a program is broadcast and stored on hard disks in compressed form, simultaneously an associated file is generated and stored. This file characterizes individual scenes in accordance with the respective tagged codes, derived from VBI data, code blocks in a digital transmission, etc. The file includes data from which the starting and ending points of individual scenes can be determined, with the ending point of a scene being conveniently determined by the broadcast receipt of the start of the next scene with a new tagged code. The system consults user preferences and the previously generated file during play of a stored program to determine scenes to be skipped and the starting point of any scene that is to follow a scene that is to be skipped. Viewing of a program cannot begin with its broadcast because if it does, then whenever a scene is to be skipped the following scene will not yet have been received. If seamless play (no gaps between scenes) is desired, then there is need to delay the start of viewing sufficiently for the recording of any scene that follows a scene to be skipped to have already been started before that scene is required for play.

26 Claims, 1 Drawing Sheet

CONTENT CONTROL OF BROADCAST PROGRAMS

BACKGROUND OF THE INVENTION

1. Field of Invention

This invention relates to the tagging of audiovisual content, such as analog or digital motion pictures that are broadcast or transmitted over cable, and streaming video transmitted over the Internet, and the seamless though selectively filtered replay of such content at some later time including near real-time.

2. Description of the Prior Art

Some people object to certain types of content in broadcast video and other programming materials. These programs are sometimes tagged with indicia that classify them as containing violence, sex, etc. in order that such programs may be filtered out. Typically, Web content is filtered by a service provider or browser. There are also systems for filtering out objectionable scenes in motion picture programming.

In its simplest form, content censoring provides only two choices—viewing or not of the overall programming material. Typically, a parent may not allow a child to view an R-rated motion picture in its entirety. Alternatively, instead of tagging a motion picture in its entirety, individual scenes might be tagged as objectionable or not, and a set-top box or PC could control selective viewing of the material based on the binary code used as a tag for each individual scene. Slightly more sophisticated systems could not only control viewing on a scene-by-scene basis, but they could give the user more control over the censoring. U.S. Pat. No. 5,913, 013 and others in the name of the same inventor, Max Abecassis, disclose the tagging of individual scenes with many different codes representing many different possible types of objectionable content. The user selects the content types to be filtered out, and thus the individual scenes to be cut. By choosing different combinations of content types to be filtered out, different users will 'produce' what in effect are different versions of the same programming material.

Since Abecassis type systems are applicable to motion pictures on DVDs, if a scene is to be cut, the viewer would be very unhappy if his screen were to go blank while the objectionable scene is processed. Therefore, what should occur is a jump immediately from the end of one scene to the beginning of the next unobjectionable scene. Toward this end, Abecassis provides a 'content map' that for each combination of codes allows the 'approved' scenes to be played seamlessly one after the other—the locations of all scenes on the DVD, and the sequence in which they are to be played, are determined before play begins. The DVD player simply jumps from predetermined scene to predetermined scene.

In an Abecassis type scheme, not only is the entire motion picture available before play begins, so is the content map that characterizes each scene (violence, objectionable language, religious irreverence, etc.) and also provides its start and end points on the DVD or other recording of the motion picture.

Some people would also like to control the filtering out of objectionable material from live broadcasts. The tagging of scenes is not difficult. There are already systems employing trained professionals who monitor, 'referee' and filter Web content and chat room conversations. There would be little difficulty in arranging for such trained professionals to monitor, classify and tag television broadcast scenes by inserting appropriate tags in the vertical blanking intervals, or in the viewing area along the lines disclosed in Broughton et al U.S. Pat. No. 4,807,031, or in coded MPEG video streams, or in a variety of other formats.

A short delay of perhaps a few seconds would have to be introduced at the supply side in order to give a coder adequate time to monitor, classify and insert tags, but the coding process would be transparent to a viewer. As soon as content in a particular category is viewed by a coder, he would insert an appropriate tag in the scene simply by pressing one of perhaps a few buttons or speaking voice activation commands to a console made available to him. The appearance of a tag different from the preceding tag would mark the beginning of a new scene for filtering purposes.

However, the scheme fails in the broadcast environment because there is no way to seamlessly jump to the next unobjectionable scene since it has not yet been broadcast— the viewer must wait until the objectionable scene or scenes have been broadcast while his screen remains blank. The same problem exists with pre-recorded broadcasts, and even pre-recorded broadcasts that are pre-tagged. If a scene is to be skipped over, for seamless play there must be another scene ready to be processed, and there isn't in the broadcast scenario.

OBJECT AND SUMMARY OF THE INVENTION

A general object of this invention is to provide for the tagging of broadcast motion pictures and streaming video materials (hereinafter "programming materials") with content type codes and the processing thereof so that selectively filtered but seamless play can be achieved.

In accordance with the principles of this invention, the viewer's set-top box is equipped with a personal video recorder such as those sold under the trademarks TiVo and ReplayTV. These devices provide for the recording of video programs and playback of them at any future time under control of a disk operating system. (The playback can be almost immediately after the recording so that the devices can simulate the 'pause' function of a video tape recorder. A viewer receiving a telephone call might continue to record a program he is watching, though as soon as the call comes in, the viewer could pause playback while the machine continues to record. At the end of the call, the viewer simply resumes play where he left off by reverting back from 'pause' to 'play.' Recording and playback take place simultaneously, with the playback lagging behind the recording. If the call takes two minutes, the effect is that of a two-minute pause.)

The live or pre-recorded broadcast or streamed video includes content tags that are inserted as discussed above. The tags are recorded along with the programming material itself, and the tags are used to control the skipping over of objectionable scenes. Seamless play is achieved by delaying the start of play after the start of recording by a time interval equal to or greater than the expected sum of the durations of the scenes to be deleted. In this way, whenever a scene is to be skipped over, the next scene will be available on the personal video recorder ready for play.

For example, if the objectionable scenes in a motion picture have a total duration of ten minutes, simply delaying play of the recorded video for at least ten minutes after the start of its broadcast will allow for seamless play even with filtered out scenes. If the tagging result is binary, i.e., a scene is either on or off the play list, then scenes are allowed or disallowed and the viewer has no control over the content other than to accept or reject the coder's judgment. If the tagging is done before the broadcast so that the sum total of the material to be deleted is known in advance, then an announcement may be made prior to the broadcast of the minimum required delay to allow for seamless play. If more sophisticated user controls are allowed, so that different viewers will 'produce' different versions of the same motion picture or streaming video, then estimates of minimum and maximum delays may be provided. In automatic systems, such as might be used with a browser, fixed delays would be in order, varying with the type and expected length of the material being broadcast, which in turn might be specified as part of a header preceding the material itself. (The tagging result need not be binary, i.e., the tagging result for a scene might not simply put a scene on or off the play list but might replace a scene judged to be offensive with a scene judged to be inoffensive if 'substitute' scenes were to be transmitted or streamed with the original program for 'swapping' with scenes that might be judged to be offensive. This would require editorial cooperation from the program supplier so that 'substitute' scenes could be created, broadcast or streamed and used as substitutes for scenes likely to be judged offensive by some viewers.)

Using a personal video recorder and delaying the start of play sufficiently after the start of recording goes only part way in solving the seamless-play problem. The start of every scene may be tagged so that the set-top box or other control device can make a decision, based on user preferences, whether the scene just beginning should be played. But if it should not be played, the set-top box must somehow be told the location of the next scene to be played. Every frame may have a time code or otherwise be given an address, but the address of the next scene must be known at the start of the present one if the present one is to be skipped.

With an Abecassis type system, a complete 'roadmap' is provided in advance, before play even begins. This type of scheme cannot be used where the coding is being done on the fly, for example, during a live broadcast. DVD players, on the other hand, use a different approach. Every scene points to the address of the next scene depending on the viewer's content preferences, see, e.g., Cookson et al U.S. Pat. No. 5,598,276. The entire 'roadmap' need not be known in advance; rather, the player is told at the end of every scene where to jump for the next scene in order to satisfy user preferences as to content. But even such an approach is insufficient for the content control under consideration because with a live broadcast the coder simply applies codes at the start of each scene—for example, the starting point for the next PG-rated or R-rated scene is not known in advance so there is no way to specify at the start of each scene the location of the next scene if the present one is to be skipped. The starting points of all scenes will be known if the coding is done before the broadcast, but for the set-top box to function as desired in all cases, it must be capable of handling even live broadcasts for which each scene is tagged as to content but a 'roadmap' is otherwise unavailable.

The solution to this problem is to generate a table as the program is being recorded on the disk. This table associates with each scene not only its tagged code, but also address information for the next scene. This address information is known as soon as the next scene comes in, and the fact that a new scene is coming in is known from the appearance of new tagged codes. The starting address of the new scene is recorded with the data for the previous scene. Thus if any scene is to be skipped over, the system will have the starting address of the next scene. If its codes dictate that it, too, is not to be played, its data will include the starting address of the following scene, etc. Delay in the start of play is necessary to accommodate the sum total of the intervals being cut so that play is seamless. This provides the necessary time to record at the end of any broadcast or streamed current scene the 'roadmap' data needed to control a jump to the next scene if the current scene is not to be played. The table data can be stored in memory, preferably non-volatile memory, or even on the disk on which the program material is recorded.

Alternatively, the table can include for each scene just its starting location on the disk and its content codes. The starting address of the next scene to be played need not be stored if the records for the scenes are stored contiguously or in some predetermined order. If this is done, the starting address for the next scene can be determined simply by looking at the next record.

BRIEF DESCRIPTION OF THE DRAWINGS

Further objects, features and advantages of the present invention will become apparent upon consideration of the following detailed description in conjunction with the drawing, in which.

DETAILED DESCRIPTION OF THE INVENTION

Typical personal video recorders are Replay Network's ReplayTV and Philips' TiVo. Both machines are Hard Disc Drive set-top devices that allow pauses in live broadcasts and playback of recorded shows. Each machine is basically a PC with a large-capacity hard drive, and the ability to download program listings periodically. (Program listings could include the maximum delay time necessary to accommodate all tagged content filtering, thus making clear and 'automatic' the start times for programs to be selectively filtered and seamlessly played as described above.)

Figure 1:
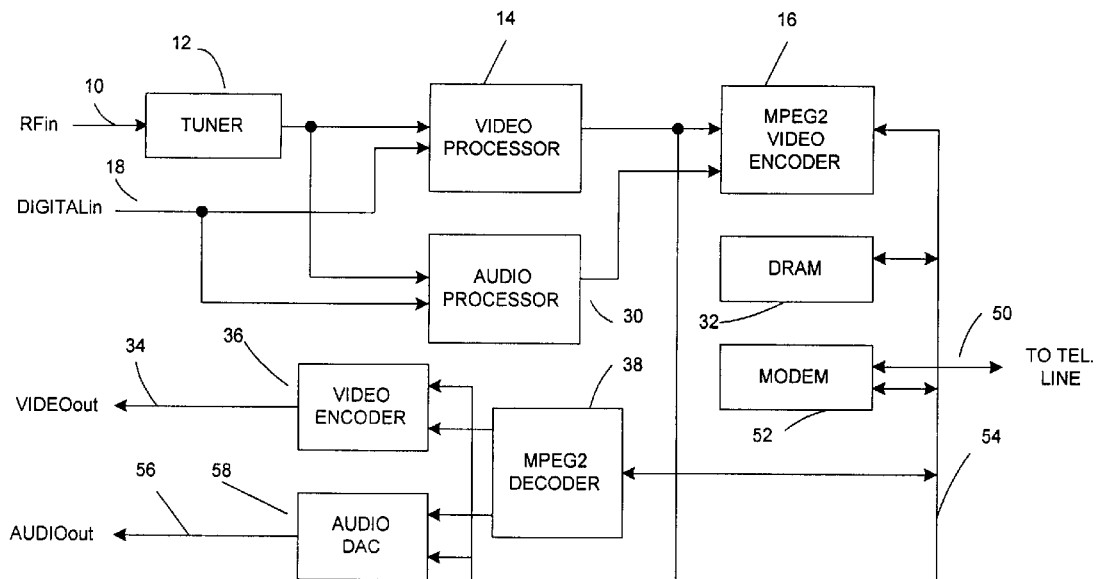
FIG. 1 depicts symbolically a block diagram schematic of components that function as a present-day personal video recorder, together with three additional connections to the circuitry of FIG. 2.

FIG. 1 depicts the main components of a generalized prior art personal video recorder. There are two inputs, an RF input 10 and a digital input 18. The RF input is extended to a tuner 12 in a conventional manner in order to select a particular channel. The digital input and the tuner output are both operated upon by a video processor 14 and an audio processor 30. Both processor outputs are compressed in MPEG2 video encoder 16 and stored on the disk(s) of hard drive(s) 74. (Alternatively, the audio and video could be processed and stored independently, e.g., MPEG 2 video compression for the video and Dolby Digital audio compression for the audio, so long as the audio and video are synchronized for play.)

Communications, both data and control, take place over system bus 54 under control of CPU 76 and its operating system. The system includes conventional components such as DRAM memory 32, a modem 52 for communicating over a telephone line, for example, to a server that furnishes TV schedule information, a serial link module 70 for communicating with other devices, and user inputs 78 which may include a keyboard and a remote control device. Under control of the operating system, stored program data is read from the hard disks, decoded in MPEG2 decoder 38, and extended through video encoder 36 to the video out line 34, and through audio digital-to-analog converter 58 to the audio out line 56. Not shown in the drawing are features that are not necessary for an understanding of the present invention, such as the different kinds of output connections that are provided (e.g., S-Video), infra-red links, a boot ROM, etc.

The basic method of the invention is to control the personal video recorder to store and selectively play a broadcast program whose scenes are tagged with content codes. To do this, the personal video recorder must employ user preferences, and this information is derived from the user inputs. The machine may include flash memory, for example, to store data that is semi-permanent, or the preference information can even be stored on the hard disks. (Alternatively, users might accept the monitoring, tagging and selective, seamless play that results from subscription to a service that routinely reflects these users' preferences. There are already browser services that filter away offensive Web sites and/or content for like-minded users. In this manner, users' preferences might form the basis of a 'community' with monitoring and tagging service providers that serve the community.)

When a program is broadcast or streamed and stored on the hard disks in compressed form, simultaneously an associated file is generated and stored. This file characterizes individual scenes in accordance with the respective tagged codes, derived from VBI data, code blocks in a digital transmission, etc.—the presence of the codes is important, not the form in which they are inserted in the broadcast. The file includes data from which the starting and ending points of individual scenes can be determined, with the ending point of a scene being conveniently determined by the broadcast receipt of the start of the next scene with a new tagged code. During play of a stored program, the system consults the stored user preferences and the previously generated file to determine scenes to be skipped and the starting point of any scene that is to follow a scene that is to be skipped.

Starting points of scenes must be recorded in the file that is generated for each recorded program. If a scene is to be skipped, determined by comparing its tag codes with user preferences, the machine has to know where on the hard drive(s) to go for the next scene. The operating system can readily determine when a new scene comes in by noting that there is a new tagged code, and the operating system can register that the disk drive location now being written is the start of the new scene. But the information is needed for the previous scene because if the determination is made during playback that the previously recorded scene should be skipped, the machine must know immediately where to go for the start of the next scene to be played.

One approach is to store in the record for each scene the starting point for the next scene. So at the same time that a record is consulted to determine whether the associated scene should be skipped, the starting point for the next scene will be ascertained if the current scene indeed should be skipped. Another approach is to store just the starting point of the current scene in the associated record, but to include a pointer for each record that points to the next successive record. (Pointers are not required if the records are stored in a predetermined order, e.g., successively.) If the determination is made that the current scene is to be skipped, then the machine can determine where the next scene is located on the hard disk(s) by consulting the next record and thus discovering the next scene's starting point.

Figure 2:
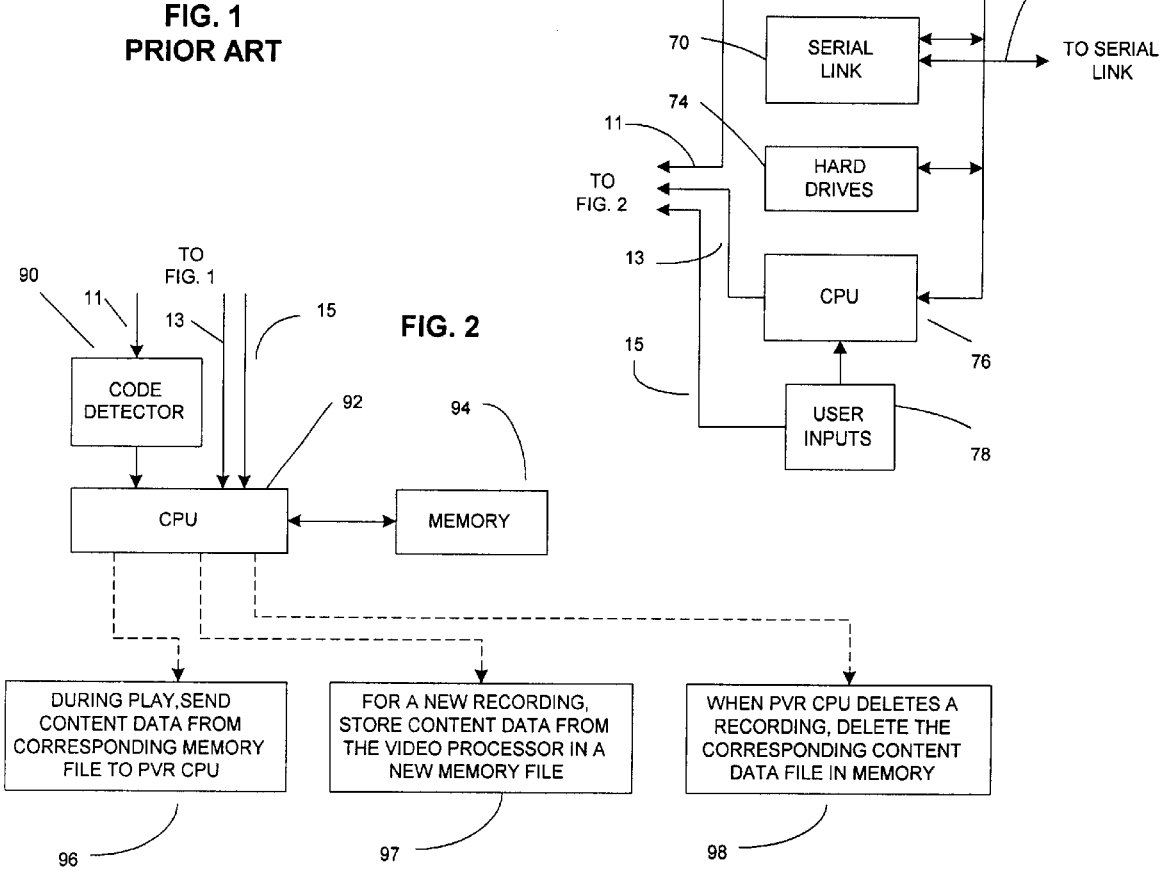
FIG. 2 depicts illustrative additional circuitry that, when added to the components of FIG. 1, implement the present invention.

The additional components required to implement the invention in the illustrative embodiment are shown in FIG. 2, and they are relatively few—a code detector 90 for detecting the scene tags, a CPU 92 for controlling the overall processing, and a memory 94 for working with the CPU. There are three connections to the conventional personal video recorder—the output of video processor 14 is connected to code detector 90 via line 11, the two CPUs are connected to each other via line 13, and the user inputs 78 are connected to CPU 92 via line 15.

Obviously, there is no necessity to have two separate CPUs, and the functions performed by the CPU 92 of FIG. 2 can be performed by CPU 76 of FIG. 1. Similarly, the memories can be combined, and the code detector 90 can be made a software function performed by a CPU. The only reason for showing a separate drawing for the additional functions required is to highlight the fact that these functions are new. In reality, no new hardware is required at all.

The three numerals 96, 97 and 98 identify software modules (connected by dashed lines to CPU 92 to show that these modules represent system functions rather than separate hardware blocks). Block 96 describes what happens during playback of a recorded program. Treating FIGS. 1 and 2 as two disjointed units, CPU 92 in FIG. 2 retrieves content data from the corresponding file in memory 94, and sends it to CPU 76 in the personal video recorder of FIG. 1. CPU 76 then determines whether to skip play of the current scene and, if it is to be skipped, where to find the next scene.

When a new recording is being made, the incoming content data must be stored in a new file in memory 94. As shown in module 97, the data is transmitted from video processor 14 over line 11 to CPU 92 which generates a new file for the program and stores it in memory 94.

Finally, when the personal video recorder deletes a program recording from the hard disk(s), there is no longer a need for the corresponding content data file in memory 94, so this file is deleted at the same time as shown in module 98.

This overall technique allows control over what is played. However, viewing cannot begin with the broadcast if seamless play is desired since if viewing were to begin together with the broadcast, then whenever a scene is to be skipped the following scene would not yet have been received. For seamless play (i.e., no gaps between scenes), the start of viewing must be delayed sufficiently so that the recording of any scene that follows a scene to be skipped must have already been started before play of that scene is required. Toward this end, if scenes are tagged with content codes before the broadcast, then the determination can be made before the broadcast begins regarding how long a delay in viewing there should be to permit seamless play. A recommended delay in play may be announced (or included in the program guide information mentioned above) before the broadcast begins about how long the viewer should wait before beginning to play back the program that is to be broadcast and played. In the event of multiple content codes, a range of delay times may be provided (or the cumulative maximum for all scene cuttings might be provided).

Although the invention has been described with reference to a particular embodiment, it is to be understood that this embodiment is merely illustrative of the application of the principles of the invention. For example, processing of a broadcast and storage of the program and the file with tags and addresses could be on a remote server, with the server then transmitting the filtered program (after a suitable delay in start time) to the user in accordance with his preferences. Thus it is to be understood that numerous modifications may be made in the illustrative embodiment of the invention and other arrangements may be devised without departing from the spirit and scope of the invention.

What is claimed is:

1. A method of controlling a personal video recorder to receive, store and selectively play a broadcast program whose scenes are tagged with content codes, comprising the steps of storing user preferences in said personal video recorder, receiving and storing the broadcast program and simultaneously generating an associated file that characterizes individual scenes by the respective tagged content codes, said file including data from which the starting and ending points of individual scenes can be determined with the ending point of a scene being determined by the broadcast receipt of the start of the next scene with a new tagged code, and during play of said stored program consulting the stored user preferences and the generated file to determine scenes to be skipped and the starting point of any scene that is to follow a scene that is to be skipped, wherein said broadcast program is preceded by the broadcast of a recommended delay in play thereof that will allow seamless jumps over scenes to be skipped.

2. A method of controlling a personal video recorder in accordance with claim 1 wherein when said personal video recorder deletes any stored program, the associated file is similarly deleted.

3. A method of controlling a personal video recorder in accordance with claim 1 wherein the content codes for individual scenes in said broadcast program are determined as the program is broadcast and the tags are applied at the time of broadcast.

4. A method of storing and selectively playing a broadcast program in accordance with claim 1 wherein the content codes for individual scenes in said broadcast program are determined as the program is broadcast and the tags are applied at the time of broadcast.

5. A personal video recorder for receiving, storing and selectively playing a broadcast program whose scenes are tagged with content codes, comprising means for storing user preferences, means for receiving the broadcast program, means for storing the broadcast program and simultaneously generating an associated file that characterizes individual scenes by the respective tagged codes, said file including data identifying the starting and ending points of individual scenes with the ending point of a scene being determined by the broadcast receipt of the start of the next scene with a new tagged code, and means for consulting said stored user preferences and said generated file during play of said stored program to determine scenes to be skipped and the starting point of any scene that is to follow a scene that is to be skipped, wherein said broadcast program is preceded by the broadcast of a recommended delay in play thereof that will allow seamless jumps over scenes to be skipped.

6. A method of storing and selectively playing a broadcast program whose scenes are tagged with content codes, comprising the steps of receiving and storing the broadcast program in a personal video recorder and generating an associated file that characterizes individual scenes by the respective tagged content codes, said file including data from which the stored locations of successive scenes can be determined, and during play of said stored program utilizing user preferences and the generated file to determine scenes that are to be skipped, wherein said broadcast program is preceded by the broadcast of a recommended delay in play thereof that will allow seamless jumps over scenes to be skipped.

7. A method of storing and selectively playing a broadcast program in accordance with claim 6 wherein when said personal video recorder deletes any stored program, the associated file is similarly deleted.

8. A method of storing and selectively playing a broadcast program in accordance with claim 6 wherein the content codes for individual scenes in said broadcast program are determined as the program is broadcast and the tags are applied at the time of broadcast.

9. A personal video recorder for storing and selectively playing a broadcast program whose scenes are tagged with content codes, comprising means for receiving the broadcast, means for storing the broadcast program and generating an associated file that characterizes individual scenes by the respective tagged codes, said file including data identifying the stored locations of individual scenes, and means for utilizing user preferences and the associated file during play of said stored program to determine scenes to be skipped and the starting point of any scene that is to follow a scene that is to be skipped, wherein said broadcast program is preceded by the broadcast of a recommended delay in play thereof that will allow broadcast of a recommended delay in play thereof that will allow seamless jumps over scenes to be skipped.

10. A method of receiving, storing and selectively playing a broadcast program whose scenes are tagged with content codes, comprising the steps of recording the broadcast program in a personal video recorder together with said content codes, said broadcast program including a recommended delay that allows seamless jumps over scenes to be skipped, playing the recorded program utilizing user preferences to determine scenes that are to be skipped, and delaying the start of play after the start of recording by said recommended delay.

11. A method of storing and selectively playing a broadcast program whose scenes are tagged with content codes, comprising the steps of storing the broadcast program and generating an associated file that characterizes individual scenes by the respective tagged content codes, said file including data from which the stored locations of successive scenes can be determined, and during play of said stored program utilizing user preferences and the generated file to determine scenes that are to be skipped, wherein said broadcast program is preceded by the broadcast of a recommended delay in play thereof that will allow seamless jumps over scenes to be skipped.

12. A method of storing and selectively playing a broadcast program in accordance with claim 11 wherein when any stored program is deleted, the associated file is similarly deleted.

13. A system for storing and selectively playing a broadcast program whose scenes are tagged with content codes, comprising means for receiving the broadcast program, means for storing the broadcast program and generating an associated file that characterizes individual scenes by the respective tagged codes, said file including data identifying the stored locations of individual scenes, and means for utilizing user preferences and the associated file during play of said stored program to determine scenes to be skipped and the starting point of any scene that is to follow a scene that is to be skipped, wherein said broadcast program is preceded by the broadcast of a recommended delay in play thereof that will allow seamless jumps over scenes to be skipped and wherein said means for utilizing user preferences delays playing the program by said recommended delay.

14. A method of receiving, storing and selectively playing a broadcast program whose scenes are tagged with content codes, wherein said broadcast program is preceded by the broadcast of a recommended delay in play thereof that will allow seamless jumps over scenes to be skipped comprising the steps comprising the steps of recording the broadcast program together with said content codes, playing the recorded program utilizing user preferences to determine scenes that are to be skipped, and delaying the start of play after the start of recording by a time interval equal to or greater than said recommended delay.

15. A personal video recorder for storing and selectively playing a broadcast program with scenes that are tagged with content codes, comprising:

a receiver adapted to receive said broadcast program;

a memory adapted to store said broadcast program and said content codes;

an output adapted to generate video signals corresponding to at least some of the scenes from said broadcast program; and a processor adapted to retrieve for said output sequentially scenes that have content codes matching a customer's preferences wherein at least one scene has a first content code which does not match said customer's preferences and said processor is adapted to omit said one scene and to delay after the start of said broadcast program the retrieval of all the other scenes by at least the duration of said one scene.

16. The recorder of claim 15 wherein said broadcast program has a predetermined number of scenes, and wherein said processor is adapted to retrieve scenes before all of said predetermined number of scenes have been stored in said memory.

17. The recorder of claim 15 wherein a first number of scenes have said first content code and a first duration, and said processor after the start of said broadcast program delays retrieving the other scenes by said first duration.

18. The recorder of claim 15 further comprising an input device used by a customer to provide his preferences.

19. A method of recording and playing a broadcast program consisting of sequential scenes, said program being associated with a recommended delay, each scene being tagged with content codes, comprising:

receiving the scenes;

storing the scenes;

storing the content codes of said scenes;

sequentially retrieving scenes having content codes meeting predetermined criteria while scenes which do not have content codes meeting said predetermined criteria are skipped; and playing the retrieved scenes after a delay time corresponding to said recommend delay to allow seamless jumps over scenes to be skipped.

20. The method of claim 19 further comprising the step of delaying after the start of the receipt of scenes the playing of the retrieved scenes by at least the total duration of the scenes to be skipped.

21. The method of claim 20 further comprising receiving said total duration as part of said broadcast program.

22. A method of controlling a personal video recorder to store and selectively play a broadcast program with scenes that are tagged with content codes, comprising the steps of:

storing user preferences in said personal video recorder;

storing the broadcast program and generating an associated file that characterizes individual scenes by their respective content codes, said file including data from which the starting points of individual scenes can be determined; and during play of said stored program consulting the stored user preferences and the generated file to determine scenes to be skipped and the starting point of any scene that is to follow a scene that is to be skipped, and wherein said broadcast program is preceded by the broadcast of a recommended delay in play thereof that will allow seamless jumps over scenes to be skipped.

23. A method of storing and selectively playing a broadcast program whose scenes are tagged with content codes, comprising the steps of:

storing the broadcast program in a personal video recorder and generating an associated file that characterizes individual scenes by their respective content codes, said file including data from which the stored locations of successive scenes can be determined, and during play of said stored program utilizing the user preferences and the generated file to determine scenes that are to be skipped; and wherein said broadcast program is preceded by the broadcast of a recommended delay in play thereof that will allow seamless jumps over scenes to be skipped.

24. A method of storing and selectively playing a broadcast program whose scenes are tagged with content codes, comprising the steps of:

storing the broadcast program and generating an associated file that characterizes individual scenes by the respective tagged content codes, said file including data from which the stored locations of successive scenes can be determined, and during play of said stored program utilizing user preferences and the generated file to determine scenes that are to be skipped; and wherein said broadcast program is preceded by the broadcast of a recommended delay in play thereof that will allow seamless jumps over scenes to be skipped.

25. A method of storing and selectively playing a broadcast program whose scenes are tagged with content codes, comprising the steps of:

recording the broadcast program in a personal video recorder together with said content codes;

playing the recorded program utilizing user preferences to determine scenes that are to be skipped; and automatically delaying the start of play after the start of recording by a time interval at least equal to the sum of the durations of the scenes to be skipped.

26. A method of storing and selectively playing a broadcast program whose scenes are tagged with content codes, comprising the steps of recording the broadcast program together with said content codes, playing the recorded program utilizing user preferences to determine scenes that are to be skipped, and automatically delaying the start of play after the start of recording by a time interval at least equal to the sum of the durations of the scenes to be skipped.

* * * * *